Feb. 18, 1936. O. SEVERSON 2,031,334

OFFSET SIDE SUPPORTED TOOL HOLDER

Filed Sept. 12, 1934

INVENTOR.
OLE SEVERSON
BY
A. T. Sperry
ATTORNEY

Patented Feb. 18, 1936

2,031,334

UNITED STATES PATENT OFFICE 2,031,334

OFFSET SIDE SUPPORTED TOOL HOLDER

Ole Severson, Shelton, Conn., assignor to The Apex Tool & Cutter Company, Inc., a corporation of Connecticut Application September 12, 1934, Serial No. 743,629

1 Claim. (Cl. 29—99)

It is among the prime objects of the present invention to provide a tool holder which, through cooperation with its tool head, will act to hold a tool bit with an improved rigidity ensuring minimum vibration, or chatter, between the holder and its supporting head.

Another object is to provide a tool holder which will have a side support and bearing against the tool head in addition to the usual support and bearings of such devices.

Another object is to provide a tool holder which will minimize the over-hang of the tool with respect to its tool head.

Other objects include the provision of a tool holder which carries out the foregoing advantages in a novel, simple device particularly designed to meet the demands of economic manufacture.

Numerous other objects and advantages of the invention will be apparent from a consideration of the present invention taken in connection with the accompanying drawing in which.

Figure 1:
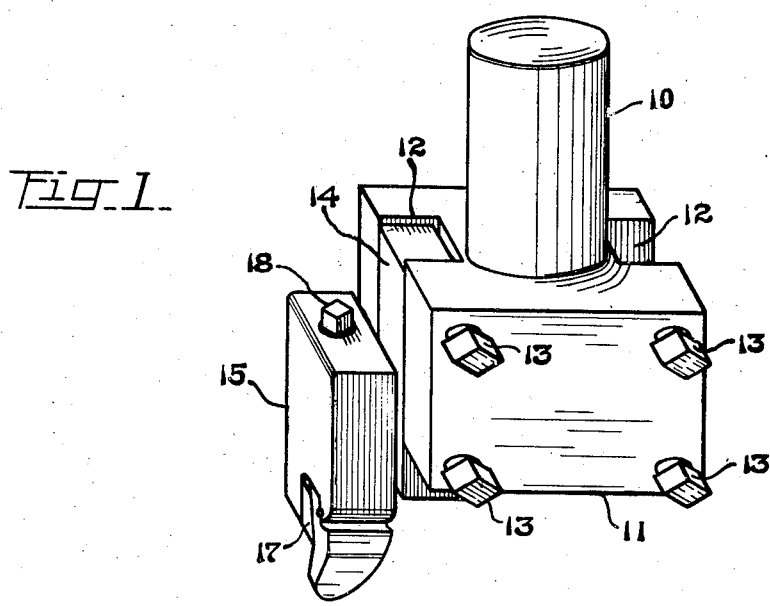
Figure 1 is a perspective view of one form of the invention assembled with its tool head.

Referring to Figure 1 of the drawing, a tool head of conventional form is illustrated, including a shank 10 and tool head body 11, which is provided with angularly walled tool holder receiving recesses 12, together with locking screws 13, which are adapted to secure a tool holder shank within the recesses.

Figure 2:
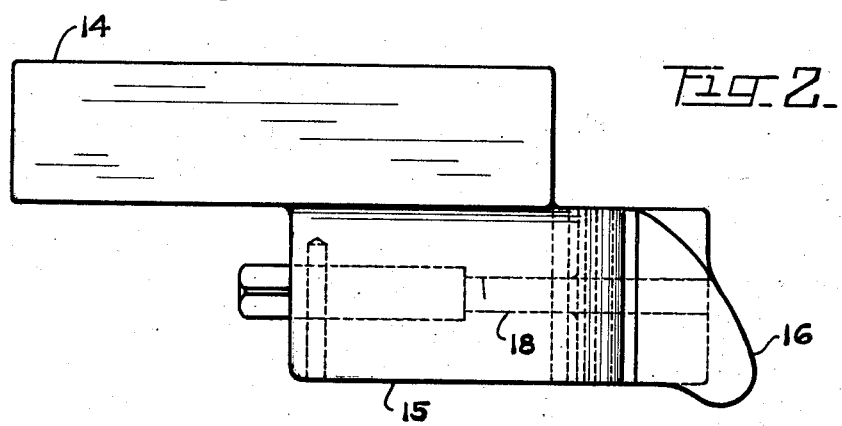
Figure 2 is a front elevation of the holder with its tool bit.
Figure 3:
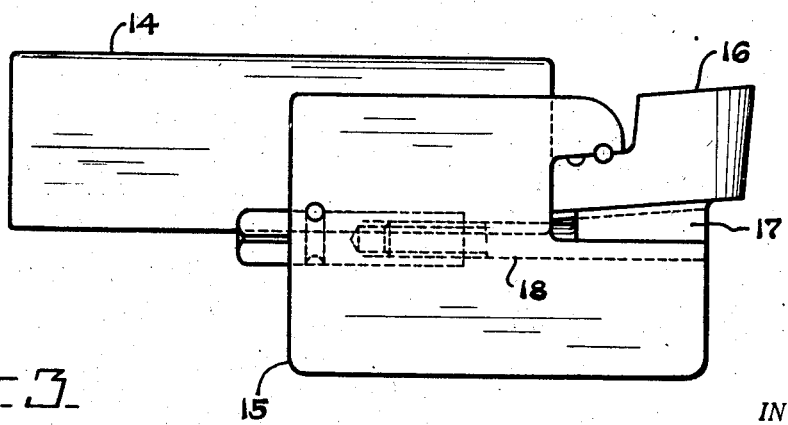
Figure 3 is a side view of the holder and bit.

The tool holder of the present invention includes a shank 14 adapted to fit within the recesses 12 and to be secured therein by the screws 13. As distinct from the conventional holder, in which the bit is secured in axial alignment with the shank, the present holder has an off-set tool holder head 15 which, by reference to Figures 2 and 3, will be seen to be off-set in two directions from the shank 14. Thus, with the shank 14 positioned within the head 11, the back face of the tool holder head will bear against the outer face of the tool head body. The construction is such that the shank and the tool holder head are both substantially rectangular in shape, the head being stepped and juxtaposed with respect to the shank.

This arrangement permits the holder shank to be wholly received within the recesses 12 so that the tool holder head has a side support bearing against the face of the tool head whereby overhand is minimized and an added rigidity of the tool head to the holder union is provided.

In that form of the invention, the structure holding the bit 16 in the holder body includes a holder platform 17 operated from a draw-bolt 18. This construction being in accordance with my co-pending application, Serial No. 737,701, entitled Draw-bolt, tool holder and bit, filed July 31, 1934. However, it will be distinctly understood that this particular bit holding construction forms no part of the present invention. The invention relates to the double directional off-set of the holder head with respect to the holder shank so that the head will protrude beyond the shank to bear against the outer face of the tool head. Obviously any preferred type of bit holding construction may be provided without departing from the spirit or scope of the invention as outlined in the pending claim.

Having set forth the nature of my invention, what I claim is:

A tool holder comprising an elongated rectangular shank adapted to be received within a tool post and having an integrally formed head of a rectangular cross section extending from the front face of the shank and being offset forwardly and to one side with respect to said shank so as to extend beyond the front face and one side wall of said shank, the top of said head being spaced downwardly from the top of said shank, said head being offset from said shank providing said head with a rear wall parallel to and oppositely facing the plane of said front face thus to form a surface adapted to abut the front face of a tool post within which said shank is secured, the side wall of said shank being adapted to abut a face of the aforementioned tool post, said head further having means for receiving and retaining a tool bit.

OLE SEVERSON.